United States Patent

[11] 3,568,152

[72] Inventor Gale A. Jallen
Roseville, Minn.
[21] Appl. No. 681,508
[22] Filed Nov. 8, 1967
[45] Patented Mar. 2, 1971
[73] Assignee Control Data Corporation
Minneapolis, Minn.

[54] METHOD AND APPARATUS FOR PRECONDITIONING A MEMORY SYSTEM

5 Claims, 4 Drawing Figs.

[52] U.S. Cl. .......... 340/174, 307/270

[51] Int. Cl. .......... G11c 7/00, G11c 11/06

[50] Field of Search .......... 340/174 (CDC), 174 (Inhibit), 2 (Diode); 307/270

[56] References Cited

UNITED STATES PATENTS

| | | | |
|---|---|---|---|
| 3,027,546 | 3/1962 | Howes et al. .......... | 340/174 |
| 3,192,510 | 6/1965 | Flaherty .......... | 340/174 |
| 3,210,741 | 10/1965 | Cohler et al. .......... | 340/174 |
| 3,293,626 | 12/1966 | Thome .......... | 340/174 |
| 3,319,233 | 5/1967 | Amemiya et al. .......... | 340/174 |
| 3,343,147 | 9/1967 | Ashwell .......... | 340/174 |

OTHER REFERENCES

" Array Charging Technique" by J. A Lake Jr., IBM Tech. Disc. Bull., Vol. 8, No. 4, Sept. 1965, P. 597

" Memory Drive System" by Caricari & Fugere IBM Technical Disclosure Bulletin Vol. 9 No. 7 Dec. 1966 pgs. 928— 929

*Primary Examiner*—James W. Moffitt
*Attorney*—Cushman, Darby and Cushman

ABSTRACT: Arrangement for preconditioning a memory system having selectable address lines to reduce adverse effects arising during addressing caused by the effective shunt capacitance of the memory. The effective shunt impedance of the memory system is increased by a switching arrangement which permits the stray capacitances of the system to be charged prior to completion of a current path through a selected address line. When such a current path is subsequently completed, the switching arrangement bypasses enough current from this path to prevent the memory from being actuated. However, during this period the effective shunt capacitance associated with the selected path discharges. Thus, when the bypass is subsequently interrupted, full current passes through the selected address line without encountering adverse effects caused by shunt capacitance.

INVENTOR
GALE A. JALLEN

BY Cushman, Darby & Cushman
ATTORNEYS

INVENTOR
GALE A. JALLEN

BY
Cushman, Darby & Cushman
ATTORNEYS

INVENTOR
GALE A. JALLEN

BY Cushman, Darby & Cushman
ATTORNEYS

INVENTOR
GALE A. JALLEN

BY Cushman, Darby & Cushman
ATTORNEYS

METHOD AND APPARATUS FOR PRECONDITIONING A MEMORY SYSTEM

In the field of data processing the evolution of circuit components and logic techniques has resulted in ever increasing operating speeds of the computer. To render such improvement meaningful, it has also been necessary to design the memory systems associated with the computer more efficiently so as to increase the effective speed in which information may be stored and retrieved from memory. One such approach has been the development of the so-called "extended core storage" system. Such an arrangement is characterized by its adaptability to the transfer of large quantities of data at a high transfer rate.

Structurally, an extended core storage consists of an assembly of closely spaced, individually selectable address lines each carrying a large number of magnetic cores. To provide the selection function, a matrix of switches is utilized, the switches being connected to the lines such that the closing of a combination of two switches results in a current path through a single address line. Typically, the matrix may take the form of a 128 × 128 switching arrangement which permits 16,384 address lines to be individually selected. Since each address line carries several hundred magnetic cores, it is apparent that the extended core storage device offers a very large memory capability. By storing several computer words on each address line, the selection of an individual line results in an effective reduction of the read/write cycle time with respect to a single word when this word is operatively related to one or more of the remaining words stored on the selected line.

While the employment of extended core storage effectively shortens the read/write cycle with respect to individual stored words, such a system also introduces serious problems which the present invention overcomes. These problems involve the large effective shunt capacitance of all the parallel address lines, their associated wiring and the switching arrangement related thereto. At the high switching frequencies employed in advanced computers, such shunt capacitance presents considerable shunt reactance to the system. This results in serious degradation of the rise time of a current pulse presented to a selected address line; the diversion of current from a selected address line when the cores associated therewith change state; and the development of noise in the sense wires of the memory system.

It is therefore the object of this invention to provide an arrangement for substantially reducing the effective shunt capacitance of an extended core storage arrangement thereby increasing the effective shunt impedance and reducing the transient effects of the current switching of the drive system for the storage device. Briefly, as described hereinafter with respect to an illustrative embodiment of the invention, this is accomplished by providing a switching arrangement which permits the memory to be preconditioned prior to a read or write operation. A first switch is closed to partially complete an electrical path from a current source through a selected group of address lines thereby resulting in the charging of the capacitance associated with these lines. The resultant charging current into the selected address lines is insufficient to operate the memory. At the completion of charging, current from the current source is partially shunted past the address lines by closing a second switch. A third switch is then closed to complete a current path through a selected address line. After sufficient time has passed to allow discharge of the capacitance associated with its group of lines, the second switch is opened to allow full current to pass through the selected address line.

The entire scope of the invention will become more fully apparent when considered in light of the following detailed description of illustrative embodiments of the invention and from the appended claims.

The illustrative embodiments may best be appreciated by reference to the accompanying drawings, wherein.

Figure 1:
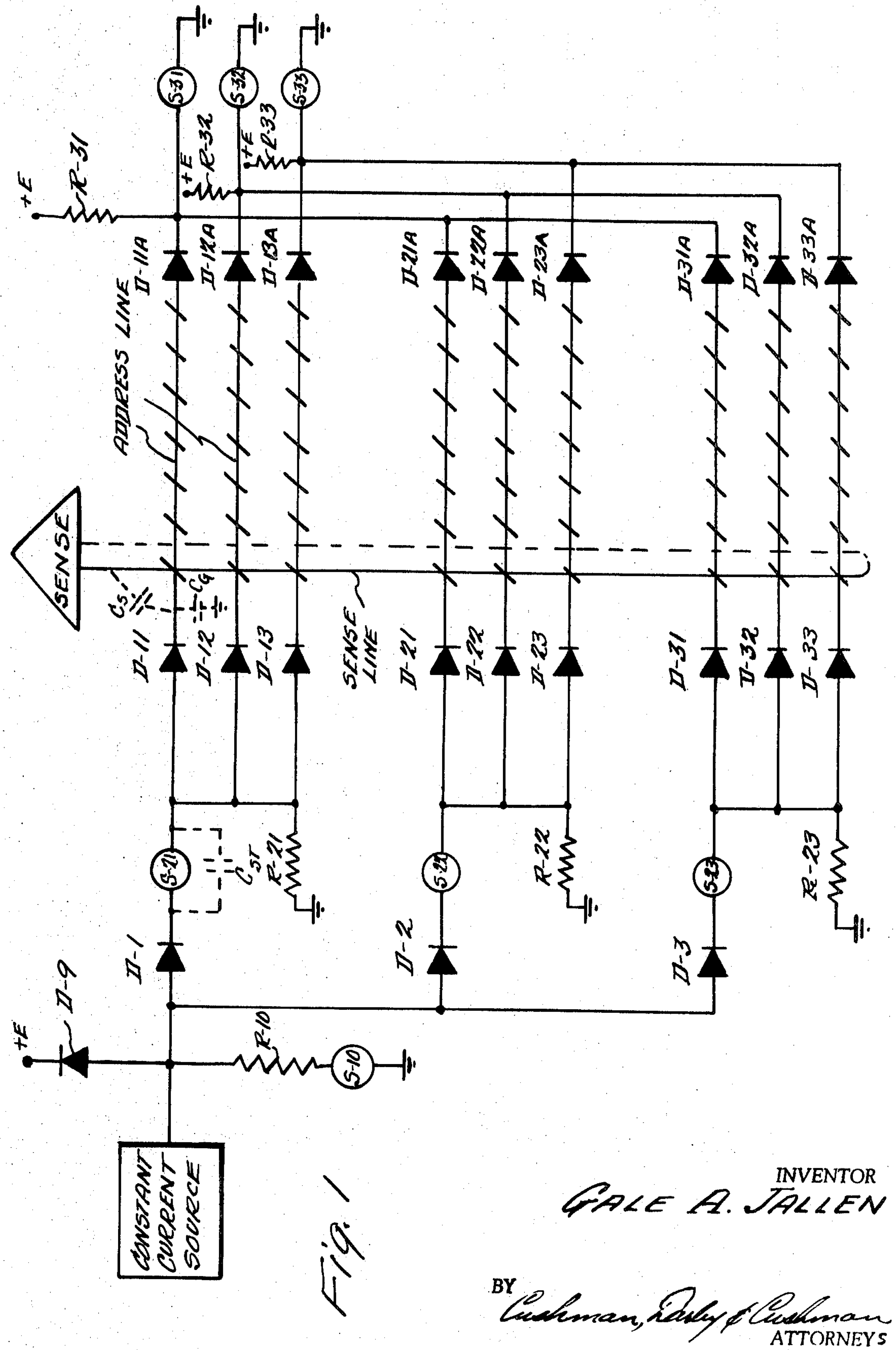
FIG. 1 is a schematic diagram of a first memory system embodying the invention.

Referring now to the drawings, the invention will be described in detail. FIG. 1 illustrates a basic storage arrangement of nine address lines each having a number of magnetic cores strung therealong. The cores are generally indicated by the slash marks (/) crossing the address lines. Each of the address lines is isolated by means of diodes at opposite ends thereof. For example, the uppermost line in FIG. 1 is isolated by diodes D–11 and D–11A. To control the selection of individual address lines, each line is connected at opposite ends to a switch. On closing of the two switches associated with a given line, current is supplied to that line. By suitable grouping of the address lines with appropriate switches, the total number of switches for a given system can be minimized. In the example illustrated, only six switches are required to permit selection of nine address lines. This is accomplished by grouping the address lines by threes and connecting a common terminal of each group to a separate switch, such as S–21. At the opposite ends of the address lines, the lines are interleaved in a different manner to be connected via a common terminal to a further switch. For example, the topmost address line of each of the three groups of lines is connected to a switch S–31. From the foregoing, it is apparent that the closing of a single one of the switches S–21, S–22 and S–23, accompanied by the closure of a single one of the switches S–31, S–32 and S–33 results in the completion of a current path through only one address line.

The address lines are driven by a constant current source which is separated from each of the three switches S–21, S–22 and S–23 by isolation diodes D–1, D–2 and D–3. The current source is limited in voltage excursion by connection through a diode D–9 to a source of positive voltage, +E. Diode D–9 functions to prevent the output of the constant current source from exceeding +E volts. The output of the constant current source is also connected through a resistor R–10 and a switch S–10 to ground to bypass the memory system.

To complete the description of the circuit of FIG. 1, it should be pointed out the common connection of each group of address lines is joined through a resistor to ground. This is shown, for example, by the common junction of the cathodes of diodes D–11, D–12 and D–13 being connected via resistor R–21 to ground. Furthermore, the common junction of the interleaved ones of the address lines is joined via a resistor to a positive voltage supply. An illustration of this is the common connection of the anodes of diodes D–11A, D–21A and D–31A through resistor R–31 to the voltage supply, +E. A sense line linking certain of the magnetic cores is also shown. It should be appreciated that other sense lines, here omitted for convenience of illustration, are contemplated, and the particular manner of linking the cores is well within the knowledge of those of ordinary skill in the art and therefore need not be discussed further.

Figure 2:
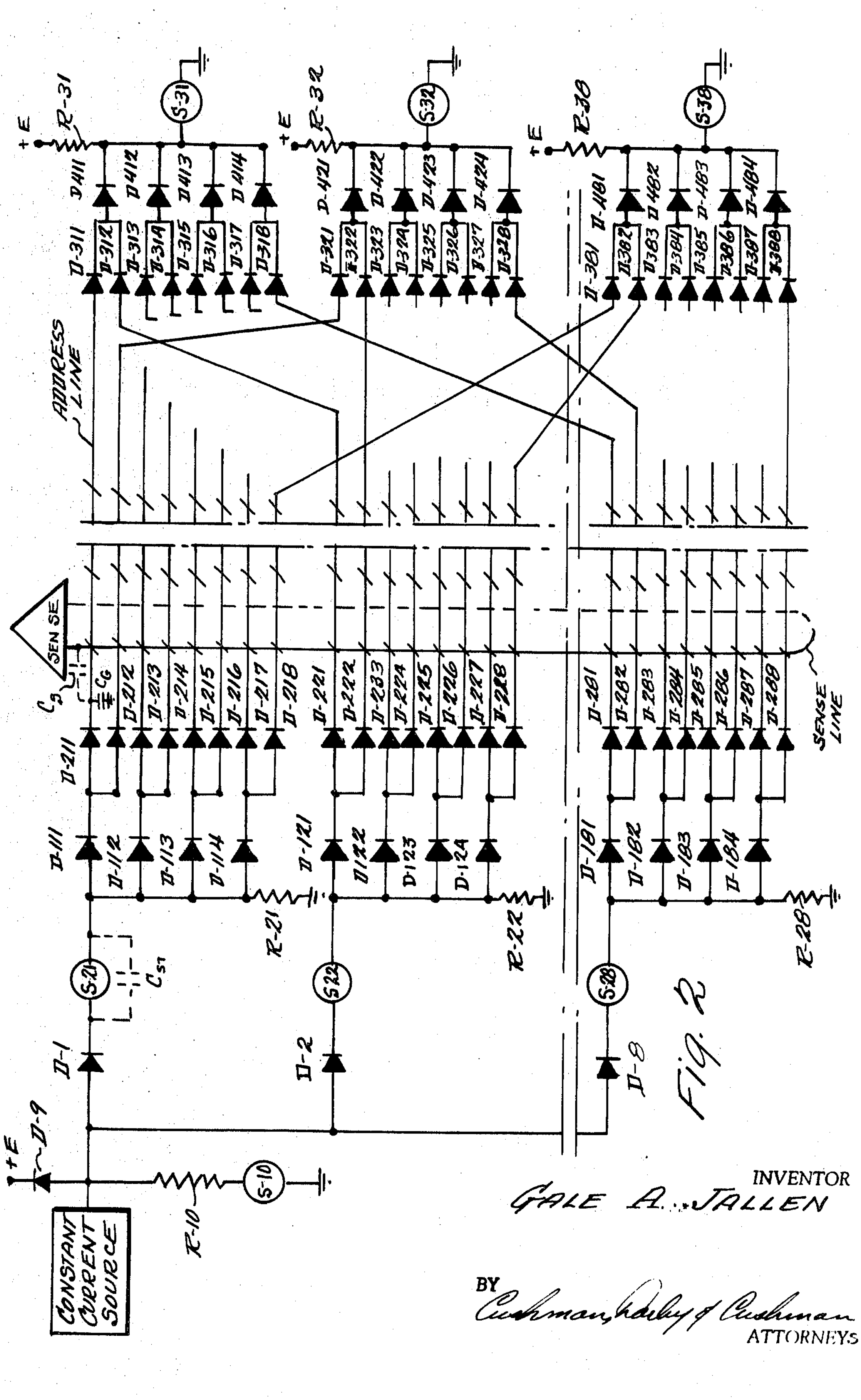
FIG. 2 is a schematic diagram of a second memory system embodying the invention.

A second embodiment of the invention is illustrated in FIG. 2. This arrangement is very similar to that described with reference to FIG. 1. However, the storage system is of larger size in that eight address line switches, S–21, S–22, etc. are positioned at each of the opposite sides of the memory system. Therefore, the switching arrangement is capable of addressing 64 memory lines. A further distinction is the utilization of additional diodes in the address line circuits. To illustrate, a diode, such as D–111, is inserted between a selector switch, such as S–21, and each pair of isolation diodes, e.g., D–211 and D–212, at the first ends of a pair of address lines. Similarly, the isolation diodes at the opposite ends of such lines, such as D–311 and D–312, are paired and are then connected through an additional diode, D–411, to the other selector switch, S–31. Although the addition of isolation diodes not found in the embodiment of FIG. 1 reduces the economy of the total storage device, the inherent capacitance of these diodes, when combined with that of the isolating diodes, D–211, D–311, etc., reduces the overall capacitance of the memory system.

Before proceeding with a description of the operation of the inventive arrangement, it should be noted that the effective capacitances which the present invention is primarily designed to reduce are:

1. the stray capacitance of all open address switches, typified by the dash line representation $C_{ST}$ across switch S–21 in FIGS. 1 and 2;
2. the capacitance of all selected address lines to ground, illustrated diagrammatically as $C_G$ in FIGS. 1 and 2;
3. the capacitance of all selected address lines to sense lines, shown as $C_S$ in FIGS. 1 and 2; and
4. the stray capacitance of all reversed biased diodes.

Figure 3:
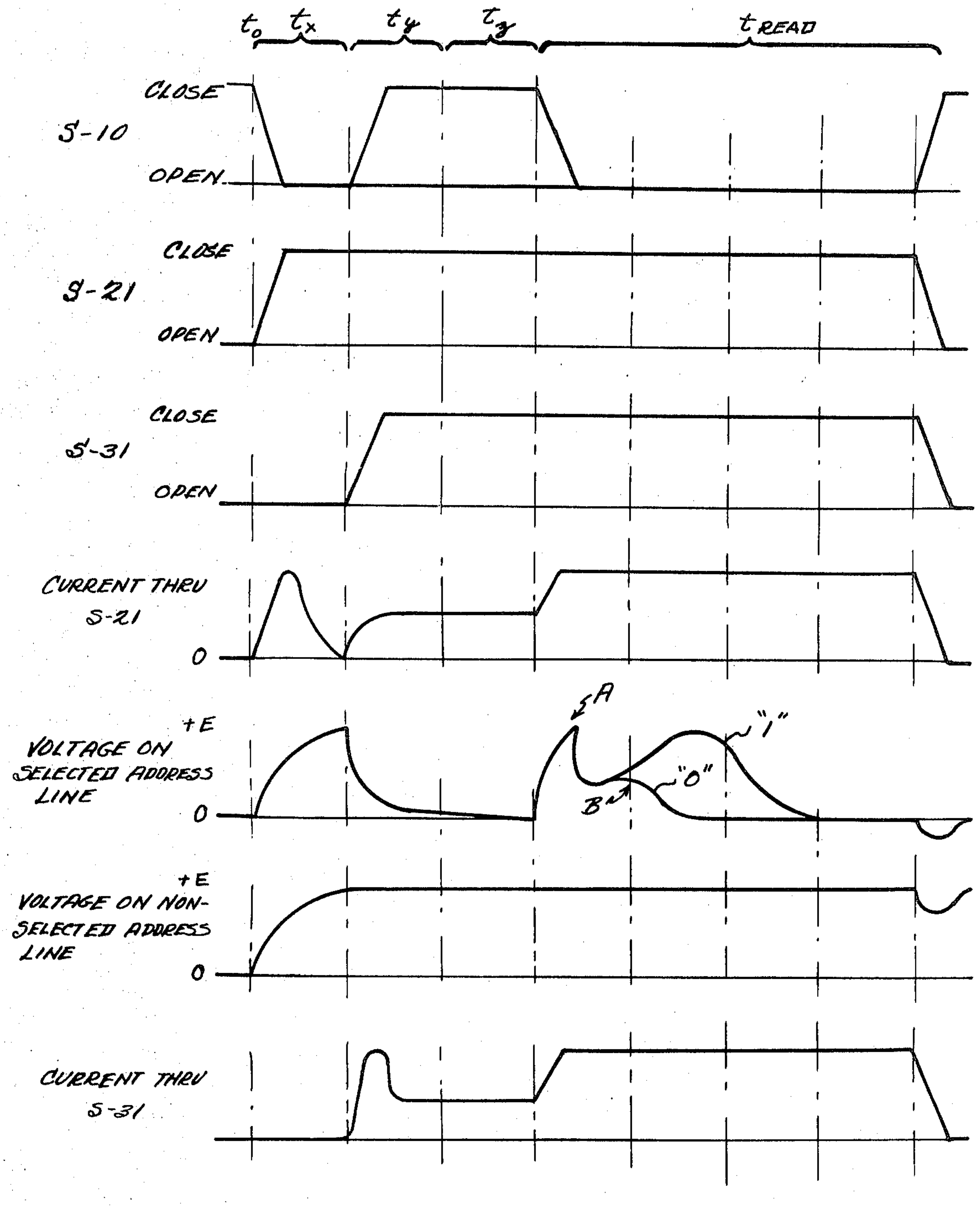
FIG. 3 is a timing diagram illustrating the waveforms obtained in the memory systems of FIGS. 1 and 2 as an address line is selected.

Referring to FIG. 3, the operation of the system will now be described. Since the operation is substantially identical with respect to each of the two structural embodiments illustrated, reference will be directed to the simpler system shown in FIG. 1, and particularly to the selection of the uppermost address line thereof. At time $t_o$, switches S–21 and S–31 are open, and switch S–10 is closed. Thus, any charge which may have accumulated between S–21 and the diodes D–11, D–12 and D–13 is discharged to ground through resistor R–21, and at the junction between diodes D–11A, D–12A and D–13A and switch S–31, a charge of +E volts is built up through resistor R–31. Immediately after time $t_o$, switch S–21 closes and S–10 opens. This permits current from the constant current source to flow into all the capacitances $C_{ST}$, $C_G$ and $C_S$. After a period of time $t_x$, provided to charge the stray capacitance to +E volts, switches S–10 and S–31 close. The closing of the latter switch completes the selection of the uppermost address line permitting current to pass therethrough. However, as will be pointed out hereinafter, this current is insufficient to operate the memory elements associated with the selected line. Nonetheless, completion of a current path through a selected address line results in the discharge of any charge capacitance related thereto, as well as discharge of capacitance associated with the unselected lines which finds a discharge path through diodes D–21A or D–31A via switch S–31 to ground. The isolating diodes D–12, D–12A, D–13, etc. and the remaining open selector switches prevent the remaining charges from leaking to ground.

At the end of a period $t_y$ allotted for the discharge through the closed switch S–31, current continues to flow from the constant current source through the selected path. However, the ratio of resistor R–10 to the load resistance in the selected line is chosen so that the current flow through the selected line is only approximately half that required to switch the cores. This current is permitted to continue for a period $t_z$ which is sufficient to settle the sensing circuitry from the charging and discharging transients. Thereafter, switch S–10 is opened to permit all of the current from the current source to flow through the selected line. Since the capacitance associated with the selected line has already been discharged, and a partial read current established, the transient effect of opening S–10 is tremendously reduced. When switch S–10 opens, there is an initial excursion A of the voltage on the selected address line caused by its inductance. However, this is followed by a voltage condition on the selected line indicative of the switching or nonswitching of cores threaded by this line. The portion 1 of the voltage pattern illustrated for the selected address line represents the switching of core state, whereas the portion 0 represents the absence of core switching in the face of full drive current through the selected line. The excursion marked B in the latter case results from delta noise in the core.

Figure 4:
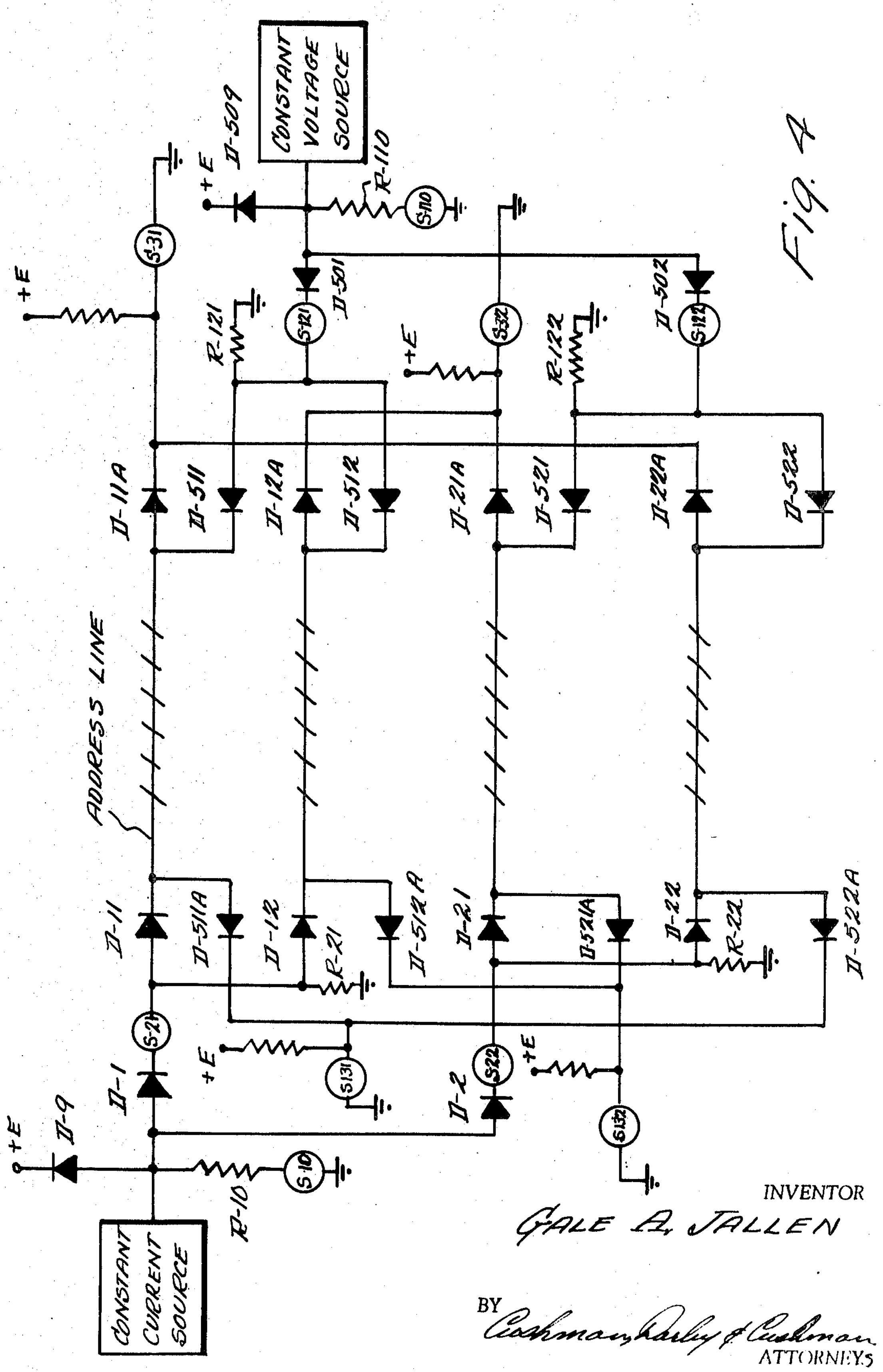
FIG. 4 is a schematic diagram of a third memory system embodying the invention, this embodiment illustrating arrangements for performing both reading and writing operations.

The foregoing description of operation has been particularly referenced to the reading of information stored in magnetic cores. However, it should be apparent that the preconditioning cycle is equally appropriate to writing information in such cores. Such an arrangement is illustrated in FIG. 4. More particularly, a simple four address line storage system is shown. The system is addressed for a reading operation by the appropriate actuation of switches S–10, S–21, S–22, S–31 and S–32 in the manner as described with reference to FIGS. 1—3 (the sense lines being entirely omitted in this embodiment for convenience of illustration). To permit a writing operation, the current source, diode and switching arrangement for reading is duplicated but is reversed in orientation with respect to the address lines. This is apparent by inspection of FIG. 4 wherein the diodes are designated by the letter D followed by numbers in the 500 series and the switches are assigned the letter S followed by numbers in the 100 series. The system is also addressed for a writing operation in the same manner as described with respect to FIGS. 1—3.

The diode arrangements shown in the foregoing embodiments conform with the polarity of the biasing voltage which has been selected for illustrative purposes. However, it is contemplated that these diodes can be reversed in sense if a negative bias is employed.

The arrangements disclosed herein are illustrative or preferred embodiments of the invention but are not intended to limit the possibilities of reducing the adverse effects of shunt capacitance associated with compact memory system. Although an extended core storage arrangement has been specifically disclosed, it is apparent that the invention may be utilized with other addressable memory systems in which stray capacitance introduces a relatively low shunt impedance to the system. The designs disclosed herein are examples of arrangements in which the inventive features of this disclosure may be utilized, and it will become apparent to one skilled in the art that certain modifications may be made within the spirit of the invention as defined by the appended claims.

I claim:

1. Apparatus for preconditioning a memory system having a plurality of individually selectable address lines, comprising:
- a current source;
- a first switching means connected between said current source and one end of a selected address line;
- an additional switching means connected to the opposite end of said selected address line to complete a current path from said source through the selected address line when the first and additional switching means are closed;
- isolation diodes connected at opposite ends of said selected address line between said first and additional switching means;
- a resistor connected at one end to a junction between said additional switching means and its associated diode and at the other end to a voltage source; and
- a still further switching means connected to said current source and operable when closed to divert from passage to the memory system at least a portion of the current from said source, said further switching means being temporarily closed when a current path through a selected address line is established thereby preventing full current through said line until the further switching means is opened.

2. Apparatus for preconditioning a memory system having a plurality of individually selectable address lines, comprising:
- a current source;
- a first switching means connected between said current source and said memory system, said first switching means including a plurality of switches each being connected to the ends of a separate group of address lines, and through a separate diode to the current source;
- an additional switching means connected between said memory system and ground, said additional switching means including a plurality of switches each being connected to the opposite ends of a different separate group of address lines formed by interleaving single address lines of each of said first-mentioned group;

isolation diodes connected at opposite ends of each address line between the associated switches of said first and additional switching means;

separate resistors each connected at one end to a junction between a switch of said additional switching means and its associated diode and, at the other end, to a voltage source; and a still further switching means connected to said current source and operable when closed to divert from passage to the memory system at least a portion of the current from said source, said further switching means being temporarily closed when a current path through a selected address path is established by closure of single switches in the first and additional switching means, the closure of said further switching means preventing full current through said selected line until said further switching means is opened.

3. A method for preconditioning a memory system having a plurality of individually selectable address lines, said method comprising the steps of:

actuating a first switch means partially completing an electrical path from a current source through a selected group of said lines;

reducing the effective magnitude of said current source to a level insufficient for operating said memory system by activating a second switch means;

actuating a third switch means to complete said electrical path through at least one of said lines; and increasing the effective magnitude of said current source to a level sufficient for operating said memory system by deactivating said second switch means.

4. A method for preconditioning a memory system as in claim 3 wherein the step of reducing the effective magnitude of said current source and the step of actuating said further switch means are performed substantially simultaneously.

5. A method for preconditioning a memory system as in claim 3 wherein the step of increasing the effective magnitude of said current source is delayed after the step of actuating said further switch means for a time interval sufficient to allow substantial discharge of all capacitance effectively connected to said second switch means.